April 17, 1951 S. E. RICHESON 2,549,387
SAFETY PRESSURE COOKER
Filed Aug. 22, 1946
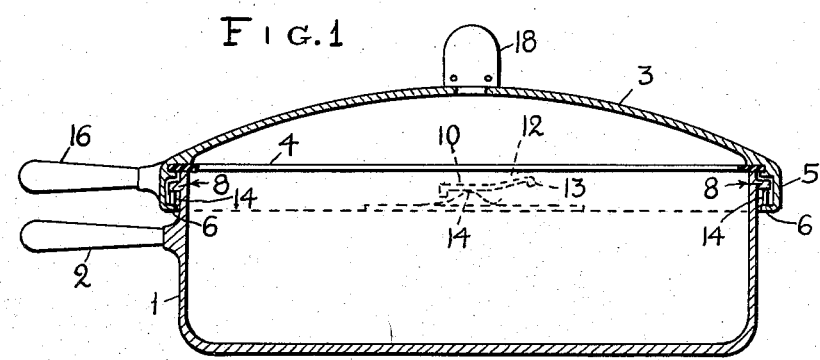
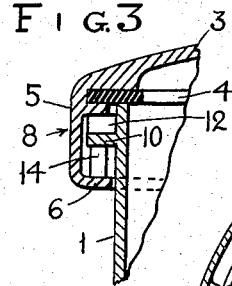
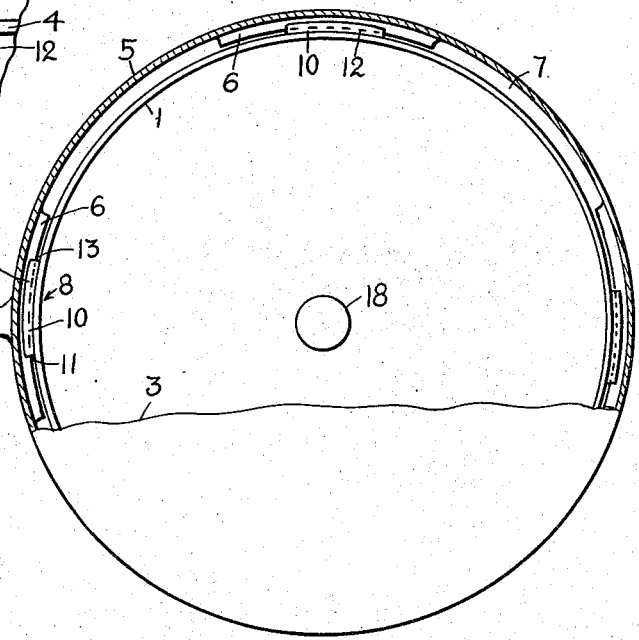
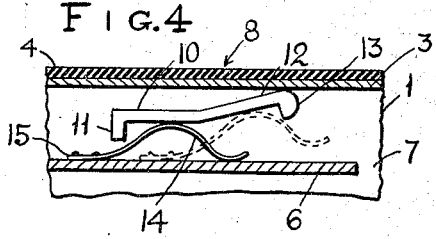
SANFORD E. RICHESON
INVENTOR.
BY John P. Wilson
ATTORNEY Patented Apr. 17, 1951

2,549,387

UNITED STATES PATENT OFFICE 2,549,387

SAFETY PRESSURE COOKER

Sanford E. Richeson, Brooklyn, N. Y., assignor of one-third to Louis C. Huber, Ridgewood, N. J., and one-third to Joseph A. Allegro, Maspeth, N. Y.

Application August 22, 1946, Serial No. 692,231

5 Claims. (Cl. 220—40)

My invention relates to safety pressure cookers and has particular reference to kitchen utensils for cooking food under pressure.

My invention has for its object to provide a pressure cooker with an additional safety feature besides the conventional safety valve.

It is well known that ordinary safety valves in pressure cookers sometimes become inoperative when they are clogged with solid particles of food being cooked. The cooking vessel under such conditions may become unsafe and may explode if the vapor pressure rises sufficiently.

To prevent such accidents and to render my pressure cooker safe under all conditions, I provide an arrangement whereby the entire lid is raised when the vapor pressure in the cooker exceeds a predetermined limit, usually higher than the limit set by the safety valve, thereby releasing the vapors along the entire periphery of the lid. Due to the relatively large area over which the vapors escape, their velocity is greatly reduced so that they cannot possibly scald the hands or face of an attendant who handles the cooker.

Another object of my invention is to provide means to prevent removal of the lid when there is vapor pressure in the cooker. With ordinary cookers there is always a danger that the lid can be released for its removal before the vapor pressure is sufficiently reduced, with a result that the lid, when released, is blown off by the vapor pressure, and the escaping vapors can scald the hands and face of the attendant.

To eliminate such a danger, I provide my cooker with a safety lock on the lid so arranged that if the lid is turned toward its released position for opening the cooker, the vapor pressure, if it is still sufficiently high, will urge the lid into a secondary locked position in which it cannot be blown away or removed and in which the vapors can escape under the lid in a harmless manner, without any danger to the attendant, gradually releasing the lid.

Still another object of the invention is to provide a safety cooker which can be cheaply manufactured and which will be convenient and reliable in its operation.

The foregoing and other objects, features and advantages are more fully described in the accompanying specification and drawing in which:

Fig. 1 is an elevational view of my cooker partly in section showing the lid in a locked position;

Fig. 2 is a top plan view of the same partly in section;

Fig. 3 is a detailed sectional view on an enlarged scale showing the locking safety arrangement for the lid; and Fig. 4 is a similar view of the locking arrangement showing its normal locked position in full lines and the unlocked safety position in dotted lines.

The safety pressure cooker consists of a vessel or pot 1 having a handle 2 at the side. A lid 3 is placed over the vessel 1 and is provided with a sealing ring 4, preferably made of a synthetic rubber or similar elastic material impervious to food substances being cooked. The ring 4 is retained in a corresponding recess in the peripheral portion of the lid 3. The lid 3 is further provided with a depending vertical flange 5 and an inward extending flange 6 at the end of the vertical flange, the inward flange being spaced from the outer wall of the vessel 1 by a small clearance. The inner flange 6 is cut away at spaced intervals forming recesses 7 of a sufficient width to provide clearances for placing the lid over lugs 8 extending outward from the vessel 1 near its top. Each lug 8 comprises a horizontal shelf 10, a depending lug 11, and upward rising shelf 12, and a second or upper depending lug 13. Portions of the flange 6 between the recesses are provided with curved leaf springs 14 secured each at one end 15 to the corresponding flange portions 6, the free ends resting freely on the inner side of the flange portion. The springs are so biased that they press lid 3 against the upper edge of the vessel 1, the pressure being generally higher than the normal cooking pressure, but below the point at which the vapor pressure could damage the vessel if the safety valve fails to function. The lid 3 is provided with a handle 16 for placing the lid in its place or removing and for turning the lid into a position in which the springs 14 slide under the horizontal lugs or shelves 10 until the springs abut the depending flanges or lugs 11. The second depending lugs 13 are somewhat higher than the level of the horizontal or holding shelves 10 so that they do not interfere with the removal of the cover when the latter is turned in a reverse direction for freeing the springs 14 and bringing the flange portions 6 opposite the spaces between the lugs 8. If, however, the lid is moved toward its release position by turning it by its handle 16 when there is a substantial vapor pressure in the vessel 1, the vapor pressure will raise the lid and force the springs 14 into the space under the tapering shelves 12 where their further movement will be prevented by the depending lugs 13. The lid will be thus held locked in a raised position, allowing the vapors to escape harmlessly downward along the periphery of the lid. Thus the tapering flanges or shelves 12, while helping to move the springs 14 into their normal position under the horizontal shelves or flanges 10, serve also as safety devices for locking the lid in a partly raised position and preventing its removal until the vapor pressure in the vessel is reduced.

The lid 3 may be provided with a conventional safety valve 18 which will release the vapors at a desired pressure and will normally operate for this purpose. Should this valve become clogged or otherwise inoperative, the pressure will be released by the lid 3 rising above the edge of the vessel 1, overcoming a pressure of springs 14, these springs being so adjusted that they release the lid at a vapor pressure somewhat higher than the pressure at which the safety valve 18 normally operates.

It will be understood that various features and principles of each of the embodiments of the invention above described or referred to may be utilized or substituted in the other embodiments.

While the invention has been described in detail with respect to a certain particular preferred example, it will be understood by those skilled in the art after understanding the invention, that various changes and further modifications may be made without departing from the spirit and scope of the invention, and it is intended therefore in the appended claims to cover all such changes and modifications.

The following is claimed as new:

1. A closure arrangement for pressure cooker of the type comprising an open vessel and a lid seated upon the rim of said vessel, said closure arrangement comprising a plurality of spaced lugs extending from the outer wall of said vessel, a depending flange extending from the periphery of said lid, said flange having a plurality of portions at its lower edge inwardly extending below the lugs, said flange portions being spaced so as to be in registry with said lugs in a certain position of the lid upon the vessel, the axial depth of said depending flange being selected so as to provide clearance between the upper side of the inwardly extending flange portions and the lower side of the respective lugs when the lugs and the flange portions are placed in registry, each of said lugs including two locking portions circumferentially spaced and disposed in different planes relative to the vessel axis, and a plurality of resilient locking elements each supported on the upper side of one of said flange portions extending therefrom toward the lower side of the lugs, each of said elements being positioned to engage, upon placing the lugs and the flange portions in one position of registry, the lower one of the locking portions of the respective lug thereby urging the lid against the vessel rim and to face the upper one of said locking portions in another position of registry, thereby providing for raising of the lid within the limits of said clearance while maintaining the lid locked to the vessel.

2. A closure arrangement for pressure cooker of the type comprising an open vessel and a lid seated upon the rim of said vessel, said closure arrangement comprising a plurality of spaced lugs extending from the outer wall of said vessel, a depending flange extending from the periphery of said lid, said flange having a plurality of portions at its lower edge inwardly extending below the lugs, said flange portions being spaced so as to be in registry with said lugs in certain positions of the lid upon the vessel, the axial depth of said depending flange being selected so as to provide clearance between the upper side of the inwardly extending flange portions and the lower side of the respective lugs when the lugs and the flange portions are placed in registry, each of said lugs including a portion slanted in circumferential direction on the side facing the flange portions, and a plurality of resilient means, each mounted on the upper side of one of said flange portions extending therefrom toward said slanted flange portions, said resilient means engaging different slanted portions of the respective lugs when the lid is rotated relative to the vessel with the lugs and the flange portions being in registry, thereby providing for limited raising of the lid by steam pressure while maintaining the lid locked to the vessel.

3. A closure arrangement as described in claim 2, wherein each lug is provided with the depending flange at each end for limiting rotation of the lid to positions in which the lugs and the flange portions are in registry when the lid is raised relative to the rim of the vessel.

4. A closure arrangement as described in claim 2, wherein each lug has a portion parallel to the plane of the rim and a portion upwardly slanted relative to the said plane, said parallel portion being positioned to be engaged by the respective resilient means when the lid is resting upon the vessel rim and said slanted portion being positioned to be engaged by the respective resilient means when the lid is raised relative to the rim of the vessel, and wherein each lug is provided with a depending flange at each end for limiting the rotation of the lid to positions in which the lugs and the flange portions are in registry when the lid is raised relative to the rim of the vessel.

5. A closure arrangement as described in claim 2, wherein each resilient means comprises a leaf spring fastened at one end to a flange portion and having a raised rounded portion facing a lug in registry with a flange portion.

SANFORD E. RICHESON.

REFERENCES CITED

The following references are of record in the file of this patent:

UNITED STATES PATENTS

| Number | Name | Date |
|---|---|---|
| 923,545 | Madison | June 1, 1909 |
| 1,818,581 | Reid | Aug. 11, 1931 |
| 2,164,478 | Smith | July 4, 1939 |
| 2,177,123 | Wittenberg | Oct. 24, 1939 |
| 2,203,801 | Swank | June 11, 1940 |
| 2,399,115 | Hansen et al. | Apr. 23, 1946 |